US012403582B2

(12) United States Patent
Throckmorton et al.

(10) Patent No.: US 12,403,582 B2
(45) Date of Patent: Sep. 2, 2025

(54) HOUSING ASSEMBLY FOR SELECTIVELY RECEIVING A PART AND A METHOD OF REMOVING PARTICLES FROM A FRICTIONAL SURFACE OF A PAD

(71) Applicant: The Boeing Company, Chicago, IL (US)

(72) Inventors: Ryan Walter Throckmorton, Seattle, WA (US); Matthew Earl Fife, Everett, WA (US)

(73) Assignee: The Boeing Company, Arlington, VA (US)

( * ) Notice: Subject to any disclaimer, the term of this patent is extended or adjusted under 35 U.S.C. 154(b) by 694 days.

(21) Appl. No.: 17/476,919

(22) Filed: Sep. 16, 2021

(65) Prior Publication Data

US 2022/0212337 A1 Jul. 7, 2022

Related U.S. Application Data

(60) Provisional application No. 63/133,551, filed on Jan. 4, 2021.

(51) Int. Cl.
*B25H 1/20* (2006.01)
*B08B 3/02* (2006.01)
(Continued)

(52) U.S. Cl.
CPC ............ *B25H 1/20* (2013.01); *B08B 3/02* (2013.01); *B08B 5/02* (2013.01); *B08B 15/00* (2013.01); *B08B 15/02* (2013.01)

(58) Field of Classification Search
CPC .. B25H 1/20; B08B 3/02; B08B 15/00; B08B 15/02
See application file for complete search history.

(56) References Cited

U.S. PATENT DOCUMENTS

| 2,709,954 A | 6/1955 | Baker |
| 4,179,984 A | 12/1979 | Gorcey |

(Continued)

FOREIGN PATENT DOCUMENTS

| CN | 101258081 A | 9/2008 |
| CN | 203801602 U | 9/2014 |

(Continued)

OTHER PUBLICATIONS

China National Intellectual Property Administration, Office Action, with English translation, App. No. 202111654886.8 (May 15, 2025).

*Primary Examiner* — Michael E Barr
*Assistant Examiner* — Kevin G Lee
(74) *Attorney, Agent, or Firm* — Walters & Wasylyna LLC

(57) ABSTRACT

A housing assembly for selectively receiving a part includes a platform and a pad fixed to the platform. The pad has a frictional surface for maintaining a position of the part relative to the pad when the part is disposed on the frictional surface. The housing assembly includes a door apparatus coupled to the platform. The door apparatus surrounds the pad. The door apparatus is movable to an open position in which the frictional surface of the pad is exposed outside of the door apparatus for receiving the part and a closed position in which the frictional surface of the pad is concealed inside of the door apparatus. A method of removing particles from a frictional surface of a pad before performing a manufacturing process has a door apparatus disposed in a closed position to present a chamber that encloses the pad.

20 Claims, 7 Drawing Sheets

(51) Int. Cl.
  *B08B 5/02*     (2006.01)
  *B08B 15/00*    (2006.01)
  *B08B 15/02*    (2006.01)

(56) References Cited

U.S. PATENT DOCUMENTS

| | | | | |
|---|---|---|---|---|
| 4,457,964 | A | * | 7/1984 | Kaminstein .......... D21H 5/0072 |
| | | | | 428/137 |
| 4,594,747 | A | * | 6/1986 | Dempsey .............. A47L 7/0066 |
| | | | | 15/301 |
| 4,856,141 | A | * | 8/1989 | Sassenberg ............... E05D 5/08 |
| | | | | 16/250 |
| 5,611,270 | A | * | 3/1997 | Harrington ............. B65F 1/163 |
| | | | | 100/902 |
| 5,882,254 | A | | 3/1999 | Jacob |
| 2008/0210276 | A1 | * | 9/2008 | Porter ....................... B08B 3/02 |
| | | | | 134/198 |
| 2015/0210306 | A1 | * | 7/2015 | Oachs ....................... B62B 3/00 |
| | | | | 280/79.11 |

FOREIGN PATENT DOCUMENTS

| | | |
|---|---|---|
| CN | 105538246 B | 10/2017 |
| CN | 207106583 U | 3/2018 |
| CN | 209965853 U | 1/2020 |
| CN | 210360273 U | 4/2020 |
| JP | H0694577 A | 4/1994 |

* cited by examiner

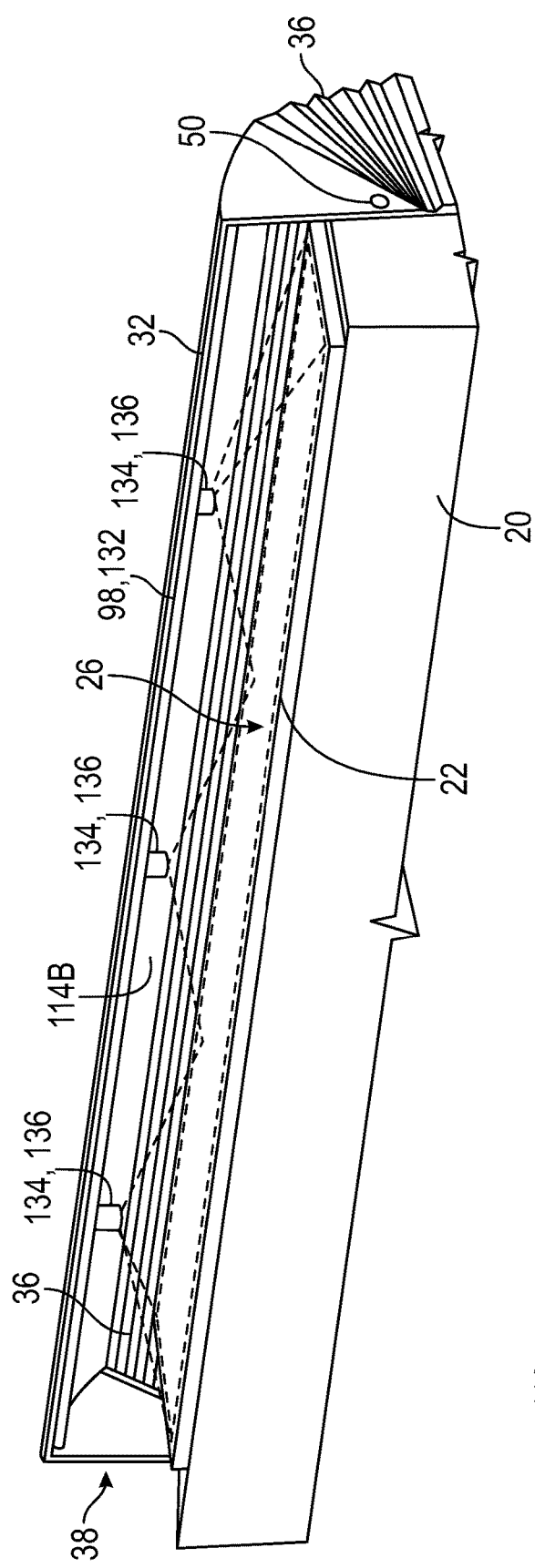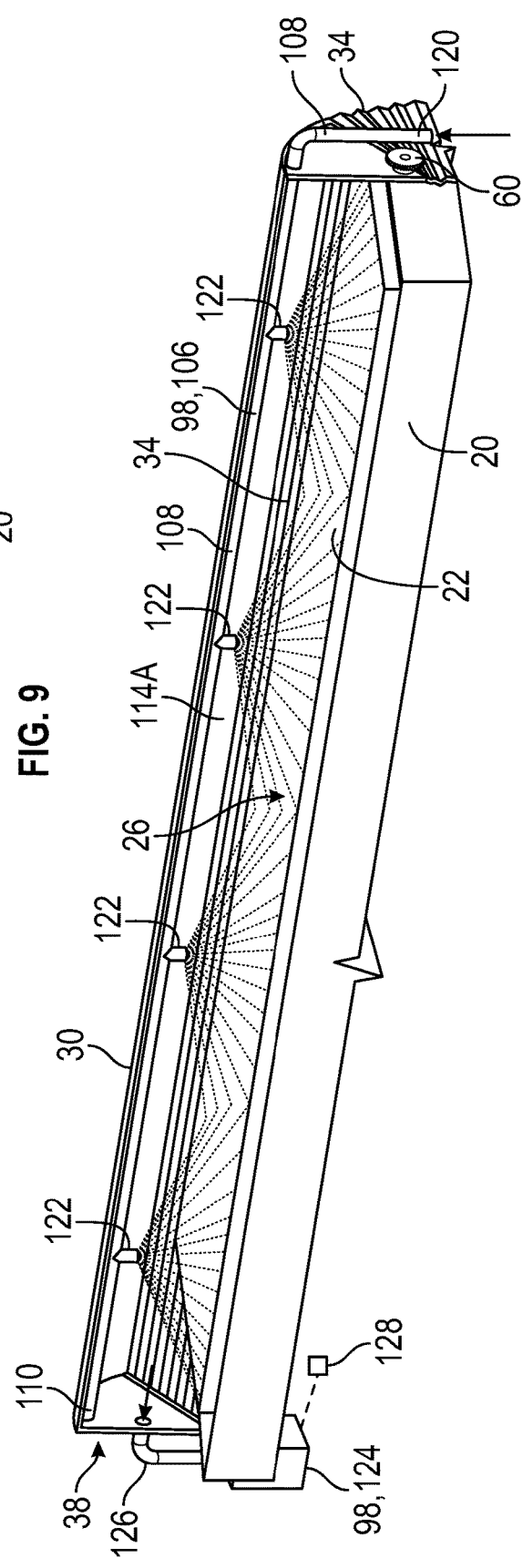

HOUSING ASSEMBLY FOR SELECTIVELY RECEIVING A PART AND A METHOD OF REMOVING PARTICLES FROM A FRICTIONAL SURFACE OF A PAD

CROSS-REFERENCE TO RELATED APPLICATIONS

This application claims priority to, and the benefit of, U.S. Provisional Patent Application No. 63/133,551 filed on Jan. 4, 2021, which is hereby incorporated by reference in its entirety.

BACKGROUND

During manufacturing processes within a facility, particles may land on various surfaces within the facility. For example, some workstations have a pad supported via a jack, and the pad provides a non-slip surface for resting a part thereon when using that workstation during one or more of the manufacturing processes. However, the pad is open to the environment so that the particles from the manufacturing processes at other workstations may land on the pad before use of that workstation which may affect the characteristics of the non-slip surface.

A manual process of cleaning the pad with water occurs before using the workstation in order to remove the particles from the non-slip surface. This manual process may also require one or more workers to be elevated on a lift to reach the locations of the pad that is to be cleaned.

SUMMARY

Therefore, there is a need for a housing assembly that conceals a pad at a workstation until it is time to use that workstation, which prevents particles from accumulating on the pad when the workstation is not being used. Furthermore, the housing assembly provides a way to clean the pad automatically without requiring one or more workers to be elevated on a lift to reach the locations of the pad that is to be cleaned.

The present disclosure provides a housing assembly for selectively receiving a part. The housing assembly includes a platform and a pad fixed to the platform. The pad has a frictional surface for maintaining a position of the part relative to the pad when the part is disposed on the frictional surface. The housing assembly also includes a door apparatus coupled to the platform. The door apparatus surrounds the pad. The door apparatus is movable to an open position in which the frictional surface of the pad is exposed outside of the door apparatus for receiving the part and a closed position in which the frictional surface of the pad is concealed inside of the door apparatus.

The present disclosure also provides a method of removing particles from a frictional surface of a pad before performing a manufacturing process. A part is placed on the frictional surface for the manufacturing process. A door apparatus is disposed in a closed position to present a chamber that encloses the pad. An image of the frictional surface of the pad is collected while the door apparatus is in the closed position. The collected image of the frictional surface is compared with a reference image of the frictional surface to determine whether particles have been detected on the frictional surface to be removed. A fluid is directed at the frictional surface of the pad to move the particles off of the frictional surface and suspend the particles inside of the chamber when the particles have been detected to be removed from the frictional surface. The suspended particles are vacuumed out of the chamber.

The detailed description and the drawings or figures are supportive and descriptive of the disclosure, but the claim scope of the disclosure is defined solely by the claims. While some of the best modes and other configurations for carrying out the claims have been described in detail, various alternative designs and configurations exist for practicing the disclosure defined in the appended claims.

BRIEF DESCRIPTION OF THE DRAWINGS

FIG. 9 is a schematic perspective view of an optical assembly of a cleaning system, with the second door segment in the closed position, and the first door segment removed to show an example position of a camera and a light relative to a frictional surface of a pad.

FIG. 10 is a schematic perspective view of a fluid applicator of the cleaning system and a vacuum of the cleaning system, with the first door segment in the closed position, and the second door segment removed to show an example position of a plurality of outlets of a tube relative to the frictional surface of the pad.

Figure 1:
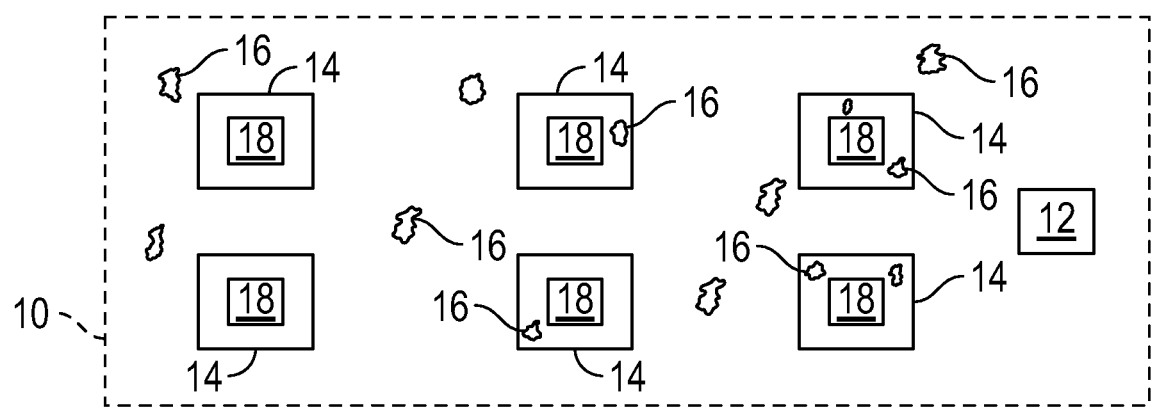
FIG. 1 is a schematic illustration of a facility including workstations to perform manufacturing processes, and one or more of the workstations include a housing assembly.

The present disclosure may be extended to modifications and alternative forms, with representative configurations shown by way of example in the drawings and described in detail below. Inventive aspects of the disclosure are not limited to the disclosed configurations. Rather, the present disclosure is intended to cover modifications, equivalents, combinations, and alternatives falling within the scope of the disclosure as defined by the appended claims.

DETAILED DESCRIPTION

Those having ordinary skill in the art will recognize that all directional references (e.g., above, below, upward, up, downward, down, top, bottom, left, right, vertical, horizontal, etc.) are used descriptively for the figures to aid the reader's understanding, and do not represent limitations (for example, to the position, orientation, or use, etc.) on the scope of the disclosure, as defined by the appended claims. Furthermore, the term "substantially" can refer to a slight imprecision or slight variance of a condition, quantity, value, or dimension, etc., some of which that are within manufacturing variance or tolerance ranges.

Referring to the figures, wherein like numerals indicate like or corresponding parts throughout the several views, a facility 10 that manufactures a part 12 or a plurality of parts 12 is generally shown in FIG. 1. The facility 10 may have one or more workstations 14 to perform multiple manufacturing processes on one or more of the parts 12. As such, a manufacturing process may occur at one of the workstations 14, and the part 12 may proceed to another one of the workstations 14 for another manufacturing process, and so on until the part 12 is completed. Alternatively, the part 12 may be completed at one of the workstations 14.

During the manufacturing process at one or more of the workstations 14, particles 16 may be circulated inside of the facility 10, some of which may land on components of one or more of the workstations 14. The particles 16 may enter the facility 10 from the environment or the particles 16 may be produced during the manufacturing processes. The particles 16 may be macroscopic or microscopic, and non-limiting examples of the particles 16 may include debris, foreign object debris (FOD), dust, flakes, grit, etc.

Generally, a housing assembly 18 may be used in the facility 10 to prevent the particles 16 from accumulating on some of the components when that workstation 14 is not being used. More specifically, the housing assembly 18 protects some of the components of the workstations 14 from the circulated particles 16 when that workstation 14 is not being used for the manufacturing process, as detailed below. The below discussion describes one housing assembly 18, however, it is to be appreciated that each of the workstations 14 may use one of the housing assemblies 18.

The housing assembly 18 selectively receives the part 12. Therefore, when the manufacturing process is to proceed at the workstation 14 with the housing assembly 18, the housing assembly 18 opens to receive the part 12. The part 12 may be any suitable configuration, and non-limiting examples may include an airplane part 12 such as a wing, a body component, body join areas, etc.

Figure 2:
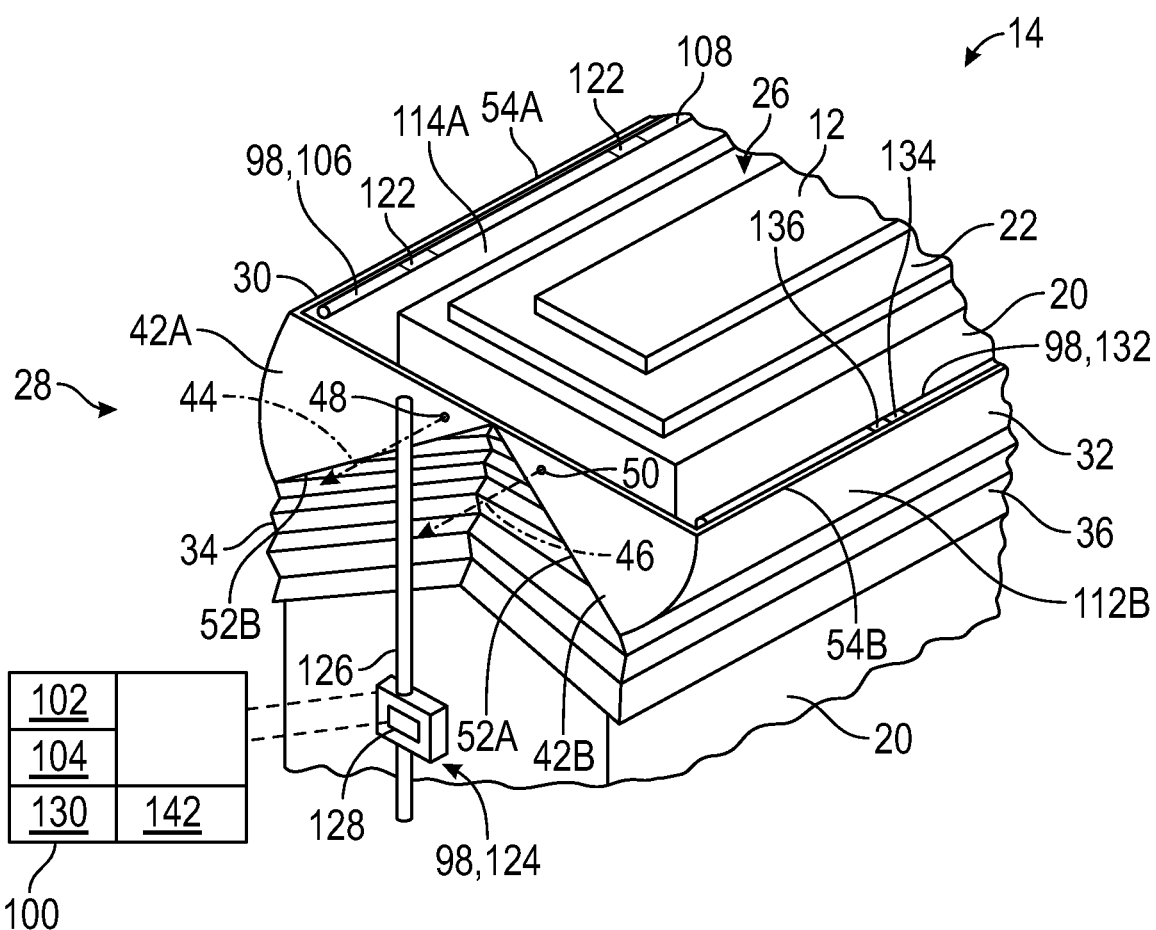
FIG. 2 is a schematic fragmentary perspective view of one end of the housing assembly.
Figure 3:
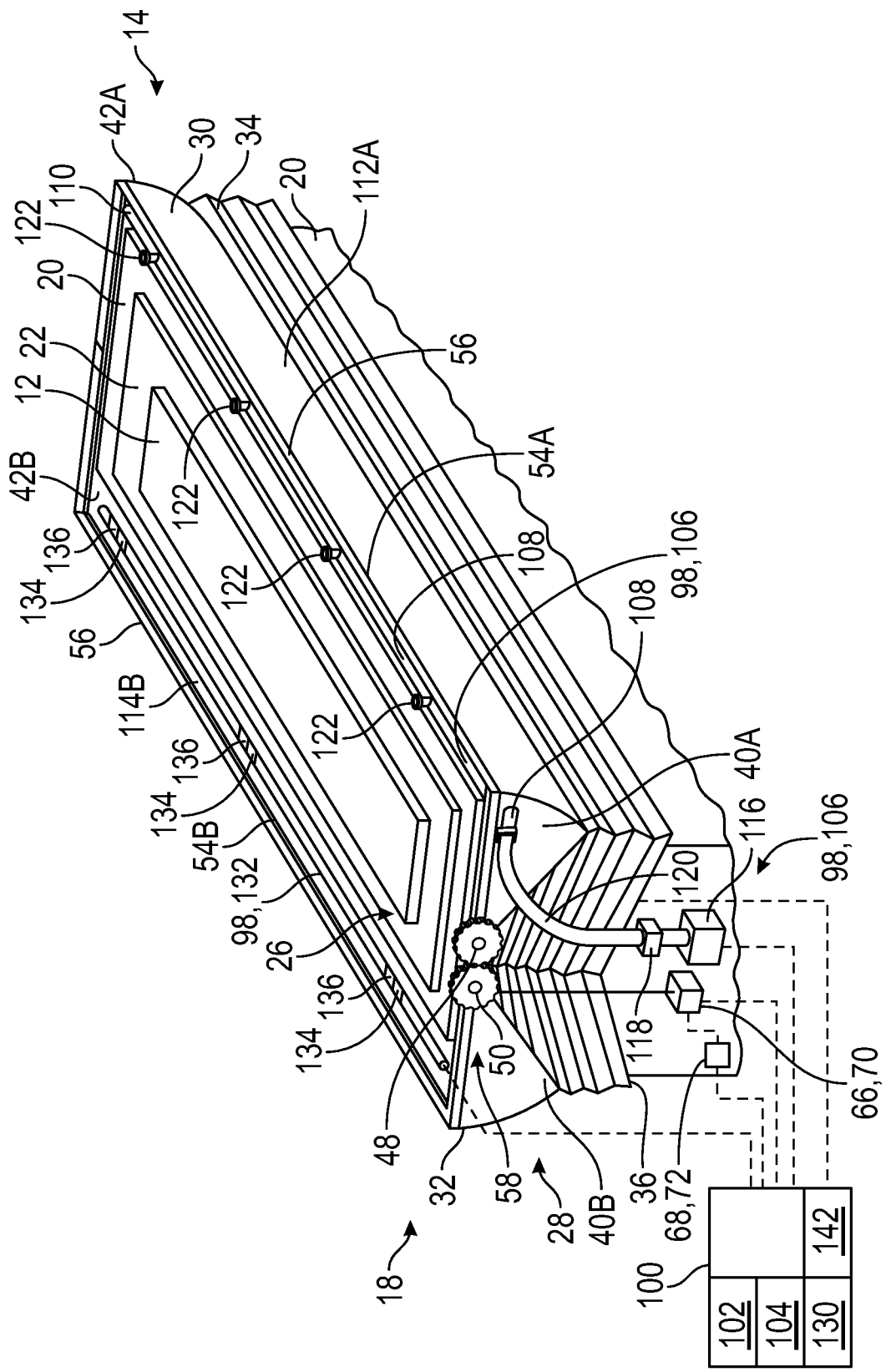
FIG. 3 is a schematic perspective view of the housing assembly of one configuration with a door apparatus in the open position.
Figure 4:
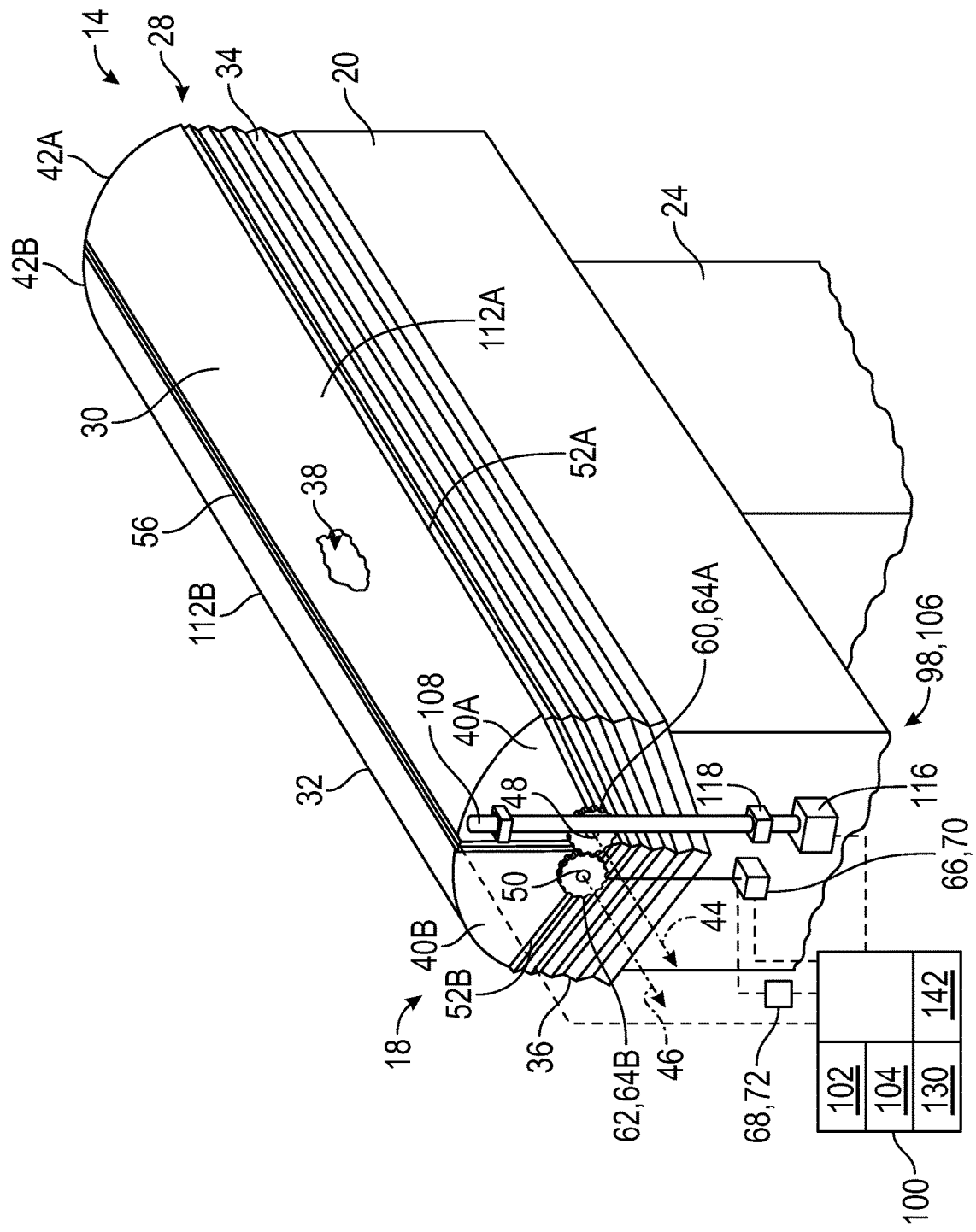
FIG. 4 is a schematic perspective view of the housing assembly of FIG. 3 with the door apparatus in the closed position.

Turning to FIGS. 2, 3 and 4, the housing assembly 18 includes a platform 20 and a pad 22 fixed to the platform 20. The pad 22 remains stationary on the platform 20. Generally, the platform 20 supports the pad 22 and the part 12 is selectively disposed on the pad 22 which is discussed further below.

Optionally, the housing assembly 18 may include a jack 24 (see FIG. 4) that supports the platform 20. The jack 24 may adjust a height of the platform 20 relative to the ground to accommodate different sizes of the parts 12. Therefore, adjusting the height of the platform 20 also adjusts the height of the pad 22 relative to the ground. The jack 24 is illustrated in FIG. 4 only, but would be disposed under the platform 20 in FIGS. 2, 3, 5, 6, 9, and 10.

Turning back to the pad 22, the pad 22 has a frictional surface 26 for maintaining a position of the part 12 relative to the pad 22 when the part 12 is disposed on the frictional surface 26. That is, the frictional surface 26 provides a non-slip surface for the part 12. As such, the frictional surface 26 provides enough friction to maintain the position of the part 12 relative to the pad 22 during the manufacturing process. The amount of friction provided via the frictional surface 26 of the pad 22 may be a predetermined threshold which may be based on engineering requirements, government requirements, etc. As one non-limiting example, a high coefficient of friction may be between the frictional surface 26 of the pad 22 and a surface of the part 12 resting against the frictional surface 26. The frictional surface 26 may be formed of any suitable material(s), and non-limiting examples may include one or more of an elastomer, a polymer, a metal, an alloy, a composite, a ceramic, a form, etc., and combinations thereof.

The frictional surface 26 of the pad 22 may face away from the jack 24. In other words, the frictional surface 26 of the pad 22 may face outwardly or upwardly such that the frictional surface 26 may be exposed in certain situations, such as to receive the part 12, as discussed below.

As best shown in FIGS. 3-6, the housing assembly 18 also includes a door apparatus 28 coupled to the platform 20, and the door apparatus 28 surrounds the pad 22. Generally, the door apparatus 28 is movable relative to the pad 22 to selectively expose the frictional surface 26 of the pad 22. More specifically, the door apparatus 28 is movable to an open position (see FIGS. 3 and 5) in which the frictional surface 26 of the pad 22 is exposed outside of the door apparatus 28 for receiving the part 12 and a closed position (see FIGS. 4 and 6) in which the frictional surface 26 of the pad 22 is concealed inside of the door apparatus 28. Therefore, when the door apparatus 28 is in the closed position, the frictional surface 26 of the pad 22 is concealed from the particles 16 outside of the door apparatus 28. Generally, when the workstation 14 is not being used, the door apparatus 28 is in the closed position to prevent the particles 16 from settling on the frictional surface 26 of the pad 22, which assists in maintaining a cleaner pad when the workstation 14 is not in use as compared to a workstation 14 that does not use the door apparatus 28.

Continuing with FIGS. 3-6, in certain configurations, the door apparatus 28 may include a first door segment 30 and a second door segment 32 movable relative to each other between the open position and the closed position. Furthermore, the door apparatus 28 may include a first bellows 34 attached to the first door segment 30 and the platform 20, and a second bellows 36 attached to the second door segment 32 and the platform 20. Generally, the first door segment 30, the first bellows 34, the second door segment 32, and the second bellows 36 cooperate in the closed position to present a chamber 38 that encloses the pad 22. That is, the frictional surface 26 of the pad 22 is protected from the particles 16 outside of the door apparatus 28 when in the closed position.

The first bellows 34 and the second bellows 36 provide some flexibility for the movement of the first door segment 30 and the second door segment 32 while maintaining a sealed connection between the platform 20 and the first door segment 30 and the second door segment 32 respectively to prevent the particles 16 from entering the chamber 38 when in the closed position. Generally, the first door segment 30 and the second door segment 32 are formed of different materials from the first bellows 34 and the second bellows 36. For example, the first bellows 34 and the second bellows 36 are each formed of a flexible material to allow movement of the first door segment 30 and the second door segment 32 without binding and while maintaining the sealed connection. For example, the first bellows 34 and the second bellows 36 may accordion together or retract when the door apparatus 28 moves to the open position (see FIGS. 3 and 5). As another example, the first bellows 34 and the second bellows 36 may accordion out or extend when the door apparatus 28 moves to the closed position (see FIGS. 4 and 6). Generally, the first bellows 34 and the second bellows 36 are configured similarly to each other. As non-limiting examples, the flexible material may be a rubber, a soft polymer, etc., and combinations thereof.

The first door segment 30 and the second door segment 32 may be formed of a rigid material which is different from the flexible material of the first bellows 34 and the second bellows 36. That is, the first door segment 30 and the second door segment 32 maintain a shape regardless of whether the door apparatus 28 is in the open position or the closed position (compare FIGS. 3 and 4). As non-limiting examples, the rigid material may be a hard polymer, a metal, an alloy, etc., and combinations thereof.

Figure 6:
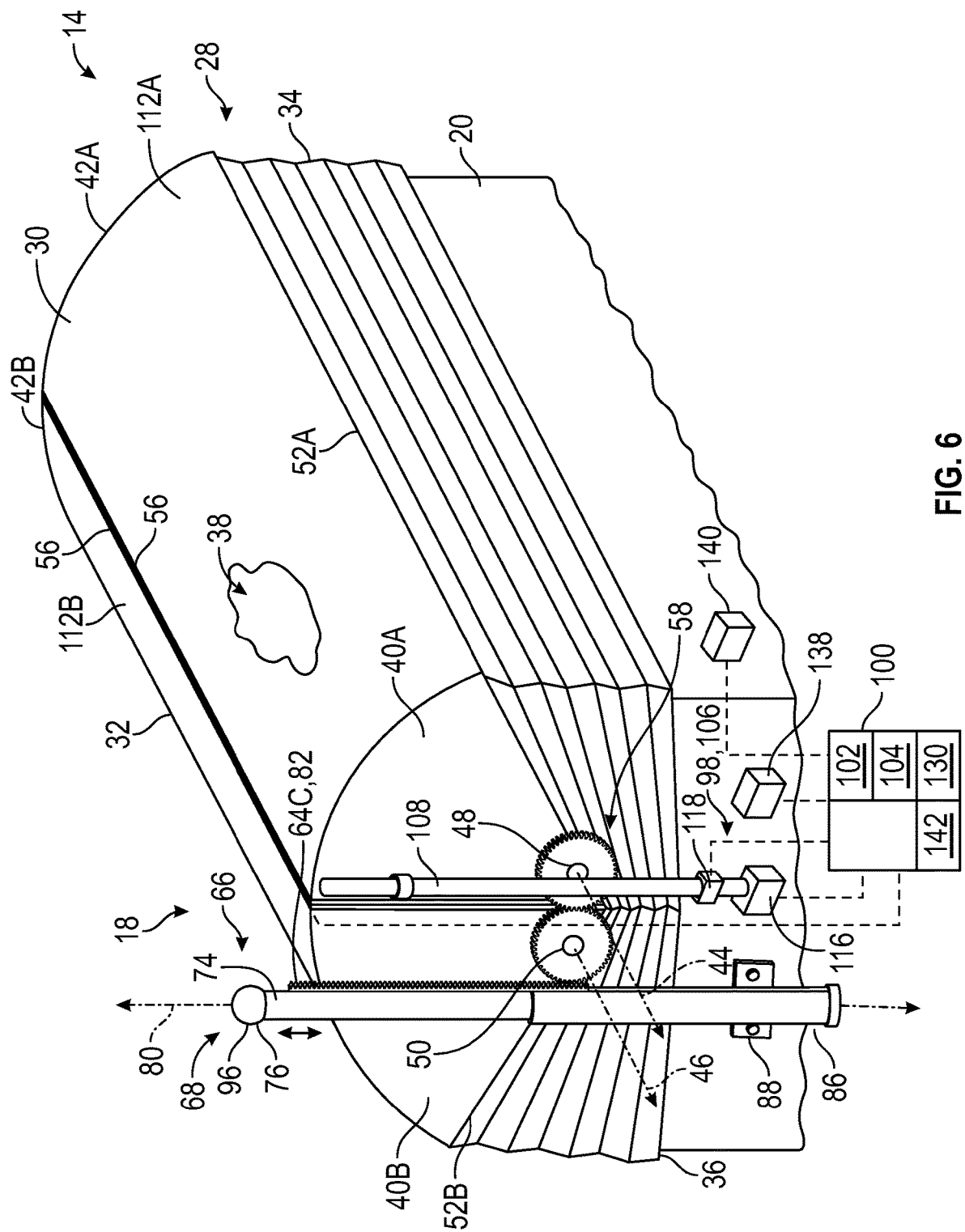
FIG. 6 is a schematic perspective view of the housing assembly of FIG. 5 with the door apparatus in the closed position.
Figure 7:
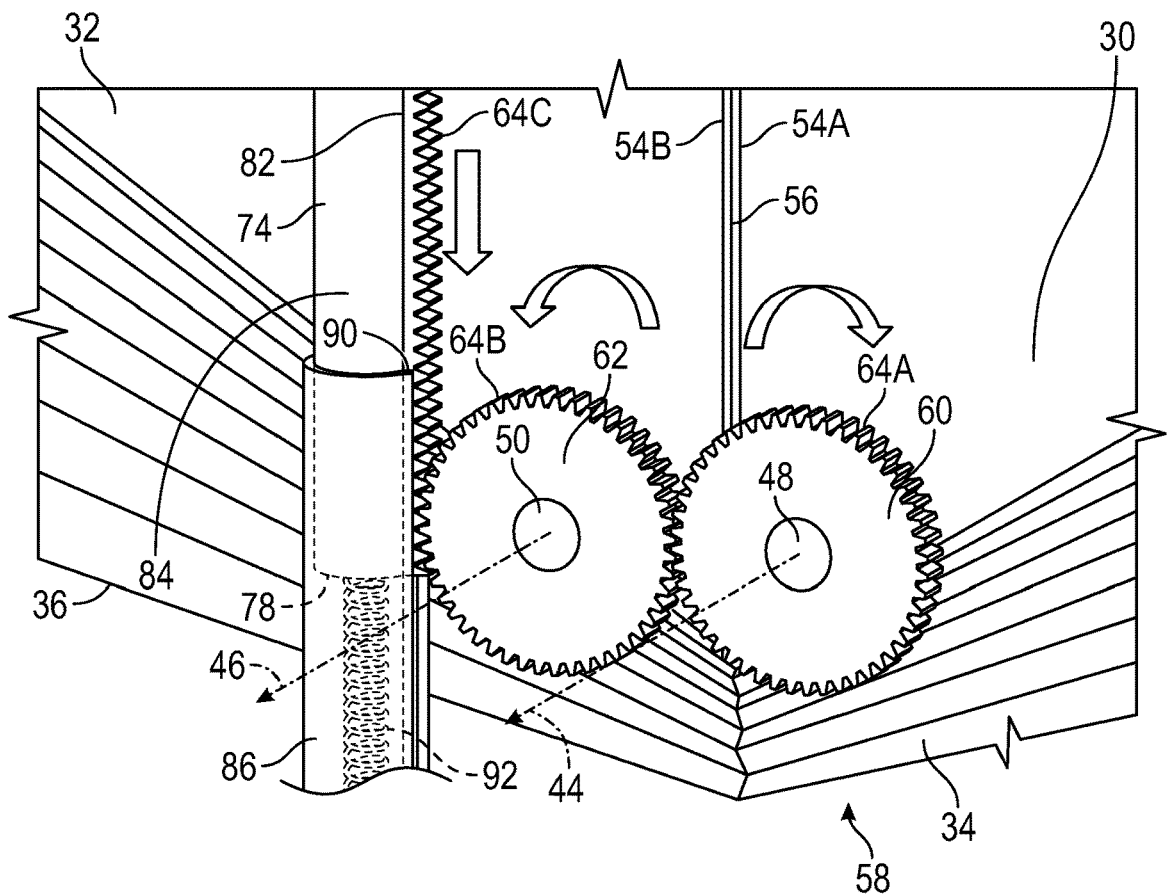
FIG. 7 is a schematic fragmentary enlarged perspective view of an actuator engaging a gear set as also illustrated in FIGS. 5 and 6.
Figure 8:
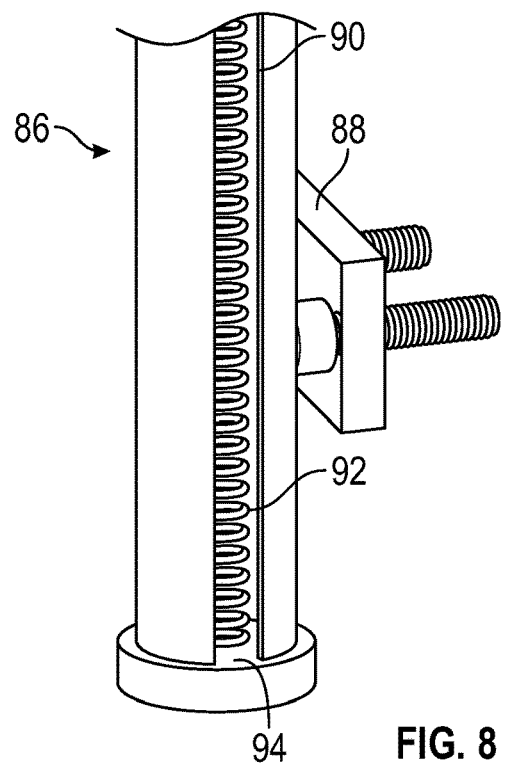
FIG. 8 is a schematic fragmentary perspective view of a casing as also illustrated in FIGS. 5-7.

Referring to FIGS. 4 and 6, the first door segment 30 may include a first distal end 40A and a second distal end 42A spaced from each other along a first longitudinal axis 44. Similarly, the second door segment 32 may include a first distal end 40B and a second distal end 42B spaced from each other along a second longitudinal axis 46. Therefore, the first distal end 40A of the first door segment 30 and the first distal end 40B of the second door segment 32 are disposed adjacent to each other at one end; and similarly, the second distal end 42A of the first door segment 30 and the second distal end 42B of the second door segment 32 are disposed adjacent to each other at the other end. Generally, in certain configurations, the first longitudinal axis 44 and the second longitudinal axis 46 are disposed substantially parallel to each other.

Figure 5:
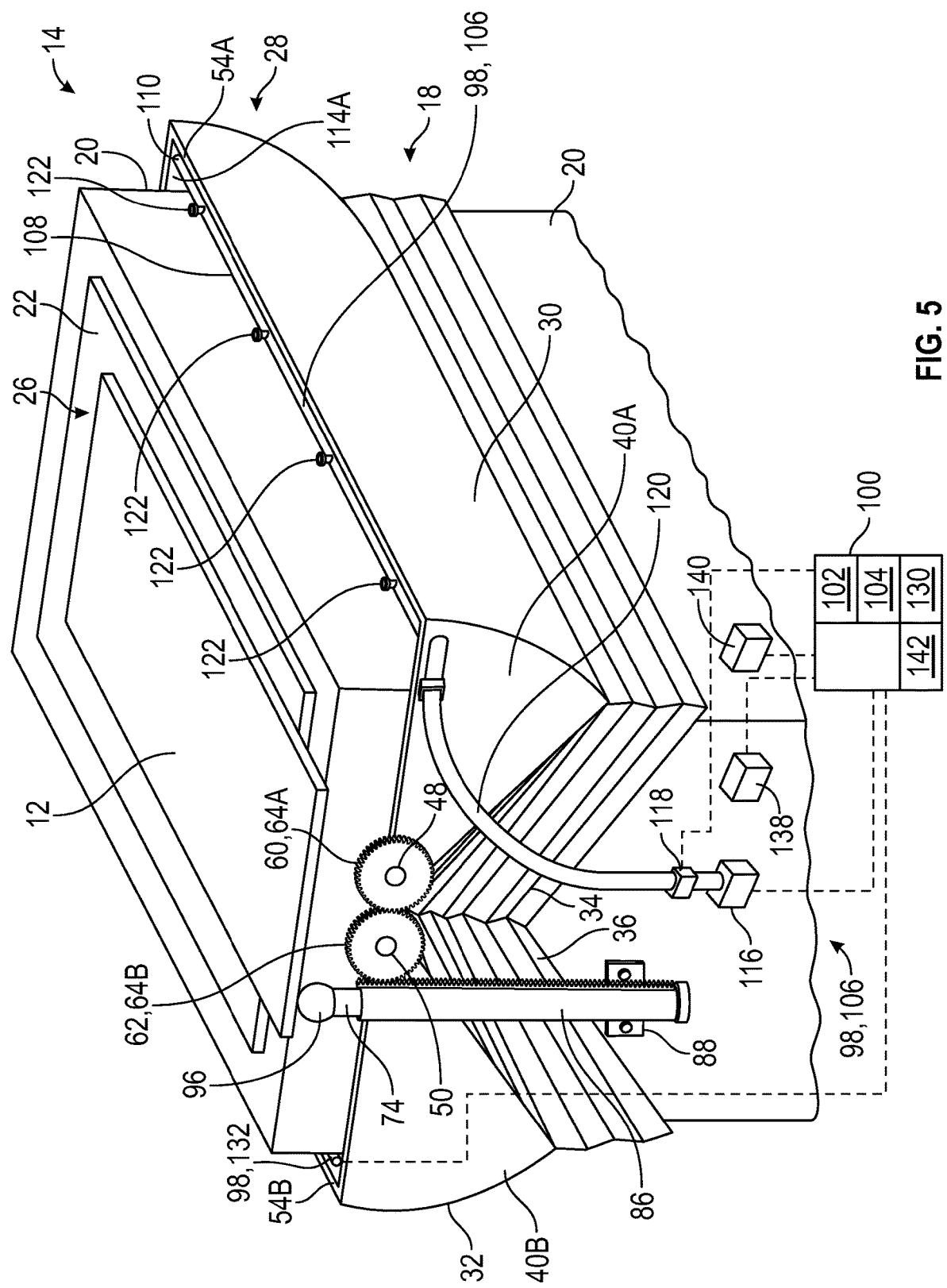
FIG. 5 is a schematic perspective view of the housing assembly of another configuration with the door apparatus in the open position.

As best shown in FIGS. 2, 3 and 5, the first door segment 30 may include a first pivot 48 disposed at the first distal end 40A and the second distal end 42A of the first door segment 30 to allow movement of the first door segment 30 relative to the platform 20. The first pivot 48 may be secured to the platform 20 to support the first door segment 30. The first pivot 48 may be disposed along the first longitudinal axis 44.

Furthermore, as best shown in FIGS. 2, 3, and 5, the second door segment 32 may include a second pivot 50 disposed at the first distal end 40B and the second distal end 42B of the second door segment 32 to allow movement of the second door segment 32 relative to the platform 20. The second pivot 50 may be secured to the platform 20 to support the second door segment 32. The second pivot 50 may be disposed along the second longitudinal axis 46.

Continuing with FIGS. 2, 3, and 5, the first door segment 30 may include a first side edge 52A having the first bellows 34 fixed thereto. Therefore, the first door segment 30 and the first bellows 34 cooperate with the platform 20 to provide a first side portion that may selectively protect the pad 22 from the particles 16. The first door segment 30 may include a second side edge 54A spaced from the first side edge 52A of the first door segment 30. Specifically, the first side edge 52A of the first door segment 30 is spaced from the second side edge 54A of the first door segment 30 transverse to the first longitudinal axis 44. The first side edge 52A of the first door segment 30 and the second side edge 54A of the first door segment 30 extends the length of the first door segment 30. That is, the first side edge 52A of the first door segment 30 and the second side edge 54A of the first door segment 30 extends from the first distal end 40A of the first door segment 30 to the second distal end 42A of the first door segment 30. The length of the first door segment 30 is substantially parallel to the first longitudinal axis 44.

Referring to FIGS. 2, 3, and 5, the second door segment 32 is configured similarly to the first door segment 30. The second door segment 32 may include a first side edge 52B having the second bellows 36 fixed thereto. Therefore, the second door segment 32 and the second bellows 36 cooperate with the platform 20 to provide a second side portion that may selectively protect the pad 22 from the particles 16. The second door segment 32 may include a second side edge 54B spaced from the first side edge 52B of the second door segment 32. Specifically, the first side edge 52B of the second door segment 32 is spaced from the second side edge 54B of the second door segment 32 transverse to the second longitudinal axis 46. The first side edge 52B of the second door segment 32 and the second side edge 54B of the second door segment 32 extends the length of the second door segment 32. That is, the first side edge 52B of the second door segment 32 and the second side edge 54B of the second door segment 32 extends from the first distal end 40B of the second door segment 32 to the second distal end 42B of the second door segment 32. The length of the second door segment 32 is substantially parallel to the second longitudinal axis 46.

When the first side portion and the second side portion come together in the closed position, the frictional surface 26 of the pad 22 is protected from particles 16 outside of the door apparatus 28 (see FIGS. 4 and 6). Therefore, the second side edge 54A of the first door segment 30 and the second side edge 54B of the second door segment 32 engage each other when the door apparatus 28 is in the closed position. Optionally, the second side edge 54A of the first door segment 30 and/or the second side edge 54B of the second door segment 32 may include a seal 56 or a gasket to further assist in sealing the chamber 38 from entry of the particles 16 when the door apparatus 28 is in the closed position. The optional seal 56 is not shown in all of the figures to illustrate other features, but it is to be appreciated that the seal 56 may be used in any of the configurations herein.

Referring to FIGS. 4 and 6, the door apparatus 28 may include a gear set 58 coupled to the first door segment 30 and the second door segment 32. Actuation of the gear set 58 causes the door apparatus 28 to move between the open position and the closed position. More specifically, actuation of the gear set 58 causes the first door segment 30 and the second door segment 32 to move between the open position and the closed position.

The gear set 58 is coupled to the first door segment 30 and the second door segment 32 at one end of the door apparatus 28. For example, the gear set 58 may be coupled to the first distal end 40A, 40B of the first door segment 30 and the second door segment 32. Therefore, the gear set 58 may be supported via the first pivot 48 and the second pivot 50 at the corresponding first distal end 40A, 40B of the first door segment 30 and the second door segment 32. As another example, the gear set 58 may be coupled to the second distal end 42A, 42B of the first door segment 30 and the second door segment 32. Therefore, the gear set 58 may be supported via the first pivot 48 and the second pivot 50 at the corresponding second distal end 42A, 42B of the first door segment 30 and the second door segment 32. It is to be appreciated that the gear set 58 may be disposed at the first distal end 40A, 40B of the first door segment 30 and the second door segment 32, or disposed at the second distal end 42A, 42B of the first door segment 30 and the second door segment 32, or gear sets 58 may be disposed at both of the first distal end 40A, 40B and the second distal end 42A, 42B of the first door segment 30 and the second door segment 32.

In certain configurations, the gear set 58 may include a first gear 60 fixed to the first door segment 30, and a second gear 62 fixed to the second door segment 32. The first gear 60 may be fixed to the first door segment 30 via the first pivot 48, and the second gear 62 may be fixed to the second door segment 32 via the second pivot 50. The first gear 60 and the second gear 62 mesh together such that the first door segment 30 and the second door segment 32 move simultaneously in response to actuation of the gear set 58. Therefore, the first gear 60 and the second gear 62 may include teeth 64A, 64B that mesh with each other.

The first gear 60 may be rotatable about the first longitudinal axis 44 and the second gear 62 may be rotatable about the second longitudinal axis 46. Therefore, the first door segment 30 is rotatable about the first longitudinal axis 44 and the second door segment 32 is rotatable about the second longitudinal axis 46. In certain configurations, the first gear 60 rotates about the first longitudinal axis 44 in an opposition direction from rotation of the second gear 62 about the second longitudinal axis 46 to open and close the door apparatus 28. Opposite rotation of the first gear 60 and the second gear 62 causes opposite rotation of the first door segment 30 and the second door segment 32.

Referring to FIGS. 3-6, the door apparatus 28 may include an actuator 66 coupled to the gear set 58 and selectively activated to move the gear set 58. Furthermore, the actuator 66 may include an activator 68 coupled to the actuator 66 to selectively activate the actuator 66 to move the gear set 58 which causes movement of the first door segment 30 and the second door segment 32 between the open position and the closed position. The actuator 66 and the activator 68 may be various configurations, and non-limiting examples are shown in FIGS. 3-8 and discussed below.

Referring to FIGS. 3 and 4, in certain configurations, the actuator 66 may include an electric motor 70, and the activator 68 may include a switch 72A. The switch 72A is in communication with the electric motor 70, and the gear set 58 is coupled to the electric motor 70. Therefore, for example, activating the switch 72A sends a signal to the electric motor 70 to actuate which causes movement of the gear set 58, and movement of the gear set 58 causes movement of the first door segment 30 and the second door segment 32. Simply stated, activation of the switch 72A causes the electric motor 70 to move the door apparatus 28 to the open position and the closed position. In one configuration, the electric motor 70 is connected to the first gear 60. In other configurations, the electric motor 70 is connected to the second gear 62. Generally, the switch 72A is activated via a worker to open and close the door apparatus 28. The switch 72A may be any suitable configuration, and non-limiting examples may include a button, a knob, a dial, a toggle, a touch surface, a lever, a motion detector, etc.

Referring to FIGS. 5-8, in other configurations, the actuator 66 may include a shaft 74 having teeth 64C that mesh with the gear set 58 such that movement of the shaft 74 in a first direction causes the gear set 58 to rotate which moves the first door segment 30 and the second door segment 32 to the open position, and movement of the shaft 74 in a second direction opposite to the first direction causes the gear set 58 to rotate differently which moves the first door segment 30 and the second door segment 32 to the closed position. More specifically, the teeth 64A of the first gear 60 or the teeth 64B of the second gear 62 mesh with the teeth 64C of the shaft 74. The part 12 engages a feature (discussed further below) of the shaft 74 which causes the shaft 74 to move in the first direction to open the door apparatus 28.

The shaft 74 extends to a first end 76 and a second end 78 along a shaft axis 80. The teeth 64C of the shaft 74 are disposed axially along the shaft axis 80. That is, the teeth 64C of the shaft 74 form a strip 82 of teeth 64C along the shaft 74. In certain configurations, the strip 82 of teeth 64C is disposed substantially parallel to the shaft axis 80. The strip 82 of teeth 64C is disposed along an outside 84 of the shaft 74 such that the teeth 64C are exposed to mesh with the gear set 58. The shaft axis 80 is disposed transverse to and offset from the first longitudinal axis 44 and the second longitudinal axis 46. The shaft 74 is movable axially along the shaft axis 80 in the first direction and the second direction. The shaft 74 may be referred to as a probe.

Continuing with the configuration of FIGS. 5-8, the actuator 66 may include a casing 86 and the shaft 74 is disposed in the casing 86. The casing 86 may be fixed to the platform 20 and/or the jack 24. For example, the casing 86 may include a mount 88 to fix the casing 86 to the platform 20 and/or the jack 24. The shaft 74 is movable relative to the casing 86 along the shaft axis 80, and the casing 86 may include a slot 90 (see FIG. 8). The teeth 64C of the shaft 74 protrude out of the slot 90 such that the teeth 64C of the shaft 74 face and engage the gear set 58. That is, the strip 82 of teeth 64C is movable back and forth within the slot 90 along the shaft axis 80 while engaging the gear set 58.

Continuing with the configuration of FIGS. 5-8, the actuator 66 may include a biasing member 92 housed inside the casing 86. The biasing member 92 continuously biases the shaft 74 in the second direction. By continuously biasing the shaft 74 in the second direction, the door apparatus 28 is continuously biased to the closed position. The biasing member 92 is disposed between the second end 78 of the shaft 74 and a reaction surface 94 of the casing 86. The reaction surface 94 of the casing 86 provides a surface for the biasing member 92 to react against to continuously bias the shaft 74 in the second direction. The biasing member 92 may be any suitable configuration, and non-limiting examples of the biasing member 92 may include a spring, a coil spring, a leaf spring, etc.

Optionally, a stop may be coupled to the casing 86 and/or the shaft 74 to prevent the shaft 74 from disconnecting from the casing 86. If no stop is being used, the biasing member 92 may be sized to bias the shaft 74 to a maximum distance within the casing 86 without causing the shaft 74 to disconnect from the casing 86.

Continuing with the configuration of FIGS. 5 and 6, the activator 68 may include a cap 96 fixed to the shaft 74. For example, the cap 96 may be attached to the first end 76 of the shaft 74. The cap 96 is exposed outside of the casing 86 such that the cap 96 is visible outside of the casing 86. Furthermore, the shaft 74 and the casing 86 may be disposed outside of the first door segment 30 and the second door segment 32. As the part 12 moves toward the housing assembly 18, the part 12 engages the cap 96 which causes actuation of the actuator 66. As such, the door apparatus 28 moves to the open position as the part 12 engages the cap 96 which moves the shaft 74 in the first direction until the part 12 rests on the frictional surface 26. In certain configurations, the cap 96 is disposed above the first door segment 30 and the second door segment 32 such that the part 12 engages the cap 96 without the part 12 interfering with the opening of the first door segment 30 and the second door segment 32.

The housing assembly 18 may also include a cleaning system 98 configured to remove the particles 16 from the frictional surface 26 of the pad 22 when the door apparatus 28 is in the closed position. The cleaning system 98 may operate in multiple functions using various components as detailed below. For example, the cleaning system 98 may operate to determine whether there are particles 16 to be removed from the frictional surface 26 of the pad 22. As another example, the cleaning system 98 may operate to remove the particles 16 from the frictional surface 26 of the pad 22. By using the cleaning system 98 discussed below, workers do not have to manually clean the frictional surface 26 of the pad 22, and thus, do not have to use a lift to reach the frictional surface 26 for cleaning purposes.

Generally, a controller 100 may be in communication with the cleaning system 98. Instructions may be stored in a memory 102 of the controller 100 and automatically executed via a processor 104 of the controller 100 to provide the respective control functionality. That is, the controller 100 is configured to execute the instructions from the memory 102, via the processor 104. For example, the controller 100 may be a host machine or distributed system, e.g., a computer such as a digital computer or microcomputer, and, as the memory 102, tangible, non-transitory computer-readable memory such as read-only memory (ROM) or flash memory. The controller 100 may also have random access memory (RAM), electrically erasable programmable read-only memory (EEPROM), a high-speed clock, analog-to-digital (A/D) and/or digital-to-analog (D/A) circuitry, and any required input/output circuitry and associated devices, as well as any required signal conditioning and/or signal buffering circuitry. Therefore, the controller 100 may include all software, hardware, memory 102, algorithms, connections, sensors, etc., necessary to control, for example, the cleaning system 98. As such, a control method operative to control the cleaning system 98 may be embodied as software or firmware associated with the controller 100. It is to be appreciated that the controller 100 may also include any device capable of analyzing data from various sensors, comparing data, making the necessary decisions required to control and/or monitor the cleaning system 98 and the door apparatus 28. The controller 100 may be in communication with the cleaning system 98 and the door apparatus 28 via an electrical connection such as hard-wires or wirelessly, etc. Optionally, more than one controller 100 may be utilized. The controller 100 may be referred to as a primary logic controller.

As mentioned above, the cleaning system 98 may operate to remove the particles 16 from the frictional surface 26 of the pad 22. For example, the cleaning system 98 may suspend the particles 16 within the chamber 38 and then remove the suspended particles 16 from the chamber 38. Generally, the particles 16 are suspended inside the chamber 38 when the door apparatus 28 is in the closed position. Therefore, before the door apparatus 28 opens to receive the part 12, the frictional surface 26 of the pad 22 may need cleaning. Once the frictional surface 26 of the pad 22 is cleaned, the door apparatus 28 may be opened, and the details of when the door apparatus 28 opens is discussed further below.

Referring to FIGS. 3-6 and 10, in certain configurations, the cleaning system 98 may include a fluid applicator 106 configured to direct a fluid at the frictional surface 26 of the pad 22 to move the particles 16 off of the frictional surface 26 and suspend the particles 16 inside of the chamber 38. As indicated above, the fluid applicator 106 operates when the door apparatus 28 is in the closed position which contains the suspended particles 16 inside the chamber 38 until those particles 16 are removed from the chamber 38 which is discussed further below. Non-limiting examples of the fluid applicator 106 may include a blower, a compressor, a fan, a pump, a sprayer, etc.

In certain configurations, the fluid that is directed at the frictional surface 26 is a gaseous fluid. Generally, the gaseous fluid is air. In other configurations, the fluid that is directed at the frictional surface 26 is a liquid fluid. Generally, the liquid fluid is water. In yet other configurations, the fluid that is directed at the frictional surface 26 is a combination of a gaseous fluid and a liquid fluid such that the mixture may be atomized. It is to be appreciated that any suitable fluid may be used to remove the particles 16 from the frictional surface 26.

Continuing with FIGS. 3-6 and 10, generally, the cleaning system 98 may include a duct 108 attached to the first door segment 30 or the second door segment 32. In one configuration, the duct 108 is attached to the first door segment 30 proximal to the second side edge 54A of the first door segment 30. Therefore, when the first door segment 30 is in the closed position, the duct 108 is positioned above the frictional surface 26 of the pad 22. For example, the duct 108 may be positioned generally centered relative to the frictional surface 26 when the door apparatus 28 is in the closed position. The duct 108 may extend the length of the first door segment 30 and/or the second door segment 32.

The duct 108 may terminate at a closed end 110. As one non-limiting example, the closed end 110 of the duct 108 may terminate adjacent to the second distal end 42A, 42B of the first door segment 30 or the second door segment 32. It is to be appreciated that more than one duct 108 may be used in the cleaning system 98, and thus, more than one duct 108 may be attached to the first door segment 30 or the second door segment 32, or one or more ducts 108 may be attached to the first door segment 30 and one or more other ducts 108 may be attached to the second door segment 32.

In certain configurations, the fluid applicator 106 may include the duct 108 attached to the first door segment 30 or the second door segment 32. The first door segment 30 and the second door segment 32 each include an outer surface 112A, 112B that faces away from the pad 22 and an inner surface 114A, 114B that faces the pad 22. Generally, the duct 108 may be attached to the inner surface 114A, 114B of the first door segment 30 or the second door segment 32.

Regardless of the location of the duct 108 being attached to the first door segment 30 or the second door segment 32, the duct 108 extends outside of the door apparatus 28 to connect to a fluid supply 116. The fluid supply 116 may provide the gaseous fluid and/or the liquid fluid through the duct 108. For example, the fluid supply 116 may be pressurized air, pressurized water, etc.

In certain configurations, the fluid applicator 106 may include a valve 118 (see FIGS. 3-6) to open and close the fluid supply 116. In other words, the valve 118 may operate to allow a flow of the fluid into the chamber 38 and prevent the flow of the fluid into the chamber 38 depending on the position of the valve 118. Therefore, when the valve 118 is opened, the fluid flows into the chamber 38, and when the valve 118 is closed, the fluid does not flow into the chamber 38. When using the valve 118, the controller 100 is in communication with the valve 118, and the controller 100 determines whether to open the valve 118 or close the valve 118.

The duct 108 includes an inlet 120 connected to the fluid supply 116 to guide the fluid into the door apparatus 28. The duct 108 may include a plurality of outlets 122 spaced from each other, and the fluid is directed out of the plurality of outlets 122. For illustrative purposes, the small dashes or dots shown being expelled out of the outlets 122 in FIG. 10 are to generally represent the fluid. In certain configurations, the plurality of outlets 122 may be spaced from each other axially relative to the first longitudinal axis 44. In other configurations, the plurality of outlets 122 may be spaced from each other axially relative to the second longitudinal axis 46. The plurality of outlets 122 face the frictional surface 26 to direct the fluid at the frictional surface 26 of the pad 22 to move the particles 16 off of the frictional surface 26 and suspend the particles 16 inside of the chamber 38. More specifically, the plurality of outlets 122 face away from the outer surface 112A, 112B and the inner surface 114A, 114B of the corresponding one of the first door segment 30 and the second door segment 32. The plurality of outlets 122 is positioned to maximize an area of the frictional surface 26 of the pad 22 that the fluid reaches to remove the particles 16. The controller 100 is in communication with the fluid applicator 106, and the controller 100 determines when the fluid applicator 106 operates, which will be discussed further below.

A segment of the duct 108 is disposed inside the door apparatus 28 and another segment of the duct 108 is disposed outside of the door apparatus 28. Specifically, if using one duct 108, the duct 108 may extend through the first door segment 30 or the second door segment 32 such that the segment of the duct 108 is disposed inside the first door segment 30 or the second door segment 32, and the another segment of the duct 108 is disposed outside of the first door segment 30 or the second door segment 32. The segment of the duct 108 that is disposed inside of the door apparatus 28 includes the plurality of outlets 122, and the another segment of the duct 108 is disposed outside of the door apparatus 28 includes the inlet 120.

At least a portion of the duct 108 is flexible to allow movement of the first door segment 30 or the second door segment 32 between the open position and the closed position. For example, the flexible portion of the duct 108 may be disposed outside of the door apparatus 28. That is, the flexible portion of the duct 108 between the fluid supply 116 and outside of the first door segment 30 or the second door segment 32 is flexible to act as a joint to allow the first door segment 30 or the second door segment 32 to move freely between the open position and the closed position (compare FIGS. 3 and 4, or FIGS. 5 and 6).

Referring to FIGS. 3-6 and 10, as another example, the cleaning system 98 may include a vacuum 124 coupled to the chamber 38. The vacuum 124 is configured to expel the particles 16 that are suspended inside the chamber 38 due to operation of the fluid applicator 106. Therefore, after the particles 16 are suspended off of the frictional surface 26 of the pad 22, the vacuum 124 pulls the fluid and the particles 16 out of the chamber 38, and thus, away from the frictional surface 26 of the pad 22. As indicated above, the vacuum 124 operates when the door apparatus 28 is in the closed position. As such, the suspended particles 16 are contained inside the chamber 38 until those particles 16 are removed from the chamber 38 via the vacuum 124. The controller 100 is in communication with the vacuum 124, and the controller 100 determines when the vacuum 124 operates, which will be discussed further below.

The vacuum 124 may be supported via the platform 20 and/or the jack 24. Furthermore, the vacuum 124 may include a conduit 126 attached to the door apparatus 28, and configured to guide the particles 16 out of the chamber 38. Therefore, when the vacuum 124 operates, the fluid and the particles 16 are expelled from the chamber 38 via the conduit 126. The conduit 126 may be disposed through the first door segment 30 or the second door segment 32. As one non-limiting example, the conduit 126 may be disposed through the second distal end 42A, 42B of the first door segment 30 or the second door segment 32. When the conduit 126 is disposed through the second distal end 42A, 42B, the closed end 110 of the duct 108 may terminate adjacent to the second distal end 42A, 42B of the first door segment 30 or the second door segment 32.

At least a portion of the conduit 126 is flexible to allow movement of the first door segment 30 or the second door segment 32 between the open position and the closed position. For example, the flexible portion of the conduit 126 may be disposed outside of the door apparatus 28. That is, the flexible portion of the conduit 126 between the door apparatus 28 and the vacuum 124 is flexible to act as a joint to allow the first door segment 30 or the second door segment 32 to move freely between the open position and the closed position. The conduit 126 is flexible similar to the duct 108, and therefore, the illustration of flexibility of the duct 108 in FIGS. 3-6 is also illustrative of the movement of the conduit 126.

Furthermore, more than one conduit 126 may be used. As such, more than one conduit 126 may be attached to the first door segment 30 or the second door segment 32, or one or more conduits 126 may be attached to the first door segment 30 and one or more other conduits 126 may be attached to the second door segment 32. Each of the conduits 126 may be connected to one vacuum 124 or optionally, more than one vacuum 124 may be used that connects to one or more conduits 126.

A sensor 128 may be coupled to the vacuum 124 to collect data about an amount of the particles 16 being expelled from the chamber 38. Therefore, the fluid and the particles 16 being pulled out of the chamber 38 flows past the sensor 128 so that the sensor 128 may collect the data about the amount of the particles 16 being expelled from the chamber 38. The sensor 128 is in communication with the controller 100, and the controller 100 determines when to shut off the vacuum 124 based on the amount of the particles 16 being expelled.

The controller 100 monitors the sensor 128 and once the data collected via the sensor 128 indicates that the amount of the particles 16 is within a predetermined range, the controller 100 may signal the vacuum 124 to shut off. Generally, when the amount of the particles 16 is within the predetermined range, this indicates that the frictional surface 26 of the pad 22 is clean. The predetermined range of the amount of the particles 16 may be based on engineering requirements, government requirements, etc. Optionally, the controller 100 may signal the fluid applicator 106 to shut off at the same time as the vacuum 124. It is to be appreciated that if using more than one vacuum 124, then more than one sensor 128 may be used and the controller 100 may collect the data from each of the sensors 128 and use that data to determine whether the predetermined range is reached.

As also mentioned above, the cleaning system 98 may operate to determine whether there are particles 16 to be removed from the frictional surface 26 of the pad 22. For example, an image 130 of the frictional surface 26 may be compiled and analyzed to determine whether the frictional surface 26 is at a predetermined clean threshold. The predetermined clean threshold of the frictional surface 26 may be based on engineering requirements, government requirements, etc. Generally, the image 130 is collected when the door apparatus 28 is in the closed position. It is to be appreciated that more than one image 130 may be collected and analyzed.

Referring to FIGS. 2, 3 and 9, in certain configurations, the cleaning system 98 may include an optical assembly 132 configured to compile the image 130 of the frictional surface 26 of the pad 22 when the first door segment 30 and the second door segment 32 are in the closed position. The cleaning system 98 may include a camera 134 attached to the first door segment 30 or the second door segment 32. In certain configurations, the optical assembly 132 may include the camera 134 attached to the first door segment 30 or the second door segment 32. Generally, the camera 134 may be attached to the inner surface 114A, 114B of the first door segment 30 or the second door segment 32. In one configuration, the camera 134 is attached to the second door segment 32 proximal to the second side edge 54B of the second door segment 32. When the second door segment 32 is in the closed position, the camera 134 is positioned above the frictional surface 26 of the pad 22. For example, the camera 134 may be positioned generally centered relative to the frictional surface 26 when the door apparatus 28 is in the closed position. Therefore, the camera 134 is positioned to maximize an area of the frictional surface 26 of the pad 22 that the image 130 may collect. It is to be appreciated that more than one camera 134 may be used, and thus, more than one camera 134 may be attached to the first door segment 30 or the second door segment 32, or one or more cameras 134 may be attached to the first door segment 30 and one or more other cameras 134 may be attached to the second door segment 32.

The camera 134 is configured to collect the image 130 of the frictional surface 26 of the pad 22. The optical assembly 132, and thus the camera 134, is in communication with the controller 100, and therefore, the controller 100 determines when to take the image 130 (i.e., determines when to operate the camera 134) and the controller 100 uses the image 130 to determine whether the frictional surface 26 of the pad 22 is clean, as discussed further below.

Since the door apparatus 28 is in the closed position when operating the optical assembly 132, the chamber 38 will be dark. Therefore, it may be desirable to illuminate the chamber 38 when taking the image 130. As such, the optical assembly 132 may include a light 136 configured to illuminate the frictional surface 26 of the pad 22 when the first door segment 30 and the second door segment 32 are in the closed position during operation of the camera 134. Using the light 136 may assist in the quality of the image 130 collected. In certain configurations, the light 136 is attached to the first door segment 30 or the second door segment 32. Generally, the light 136 may be attached to the inner surface 114A, 114B of the first door segment 30 or the second door segment 32. In one configuration, the light 136 is attached to the second door segment 32 proximal to the second side edge 54B of the second door segment 32. When the second door segment 32 is in the closed position, the light 136 is positioned above the frictional surface 26 of the pad 22. For example, the light 136 may be positioned generally centered relative to the frictional surface 26 when the door apparatus 28 is in the closed position. Therefore, the light 136 is positioned to maximize an area of the frictional surface 26 of the pad 22 that the light 136 illuminates. It is to be appreciated that more than one light 136 may be used, and thus, more than one light 136 may be attached to the first door segment 30 or the second door segment 32, or one or more lights 136 may be attached to the first door segment 30 and one or more other lights 136 may be attached to the second door segment 32. The light 136 may be any suitable configuration to illuminate the frictional surface 26, and non-limiting examples may include a light bulb, a light-emitting diode (LED), etc. The controller 100 is in communication with the light 136, and the controller 100 determines when to operate the light 136.

The present disclosure also provides a method of removing the particles 16 from the frictional surface 26 of the pad 22 before performing the manufacturing process. The part 12 is placed on the frictional surface 26 for the manufacturing process. Therefore, the particles 16 are removed from the frictional surface 26 first, and then the door apparatus 28 may be opened to receive the part 12 to perform the manufacturing process when the frictional surface 26 is clean, as detailed below.

The door apparatus 28 is disposed in the closed position to present the chamber 38 that encloses the pad 22. The door apparatus 28 remains in the closed position until it is desired to use that workstation 14. By maintaining the door apparatus 28 in the closed position until that workstation 14 is being used, particles 16 from operating other workstations 14 will not be able to settle on the frictional surface 26 of the pad 22 of the workstations 14 that are not in use.

Prior to opening the first door segment 30 and the second door segment 32, it is desirable to determine whether particles 16 need to be removed from the frictional surface 26 of the pad 22. The controller 100 is activated prior to opening the door apparatus 28, and the controller 100 then analyzes the data collected about the particles 16 and determines whether the frictional surface 26 of the pad 22 is clean. If the controller 100 determines that the frictional surface 26 of the pad 22 is clean, then the door apparatus 28 may be opened to receive the part 12. If the controller 100 determines that the frictional surface 26 of the pad 22 is not clean, then the door apparatus 28 does not open to receive the part 12, and a cleaning process occurs.

To activate the controller 100 to start this process, in certain configurations, the activator 68 of the electric motor 70 may be activated. The electric motor 70 will not operate to open the door apparatus 28 until the controller 100 determines that the frictional surface 26 is clean by following the process below.

In other configurations, such as when the activator 68 is disposed on the shaft 74, a separate activator 138 may be activated which is in communication with the controller 100. The separate activator 138 is not connected to the activator 68 on the shaft 74. The separate activator 138 may be a switch 72B. The switch 72B of the separate actuator 66 may be any suitable configuration, and non-limiting examples may include a button, a knob, a dial, a toggle, a touch surface, a lever, a motion detector, etc. In this configuration, an indicator 140 may be in communication with the controller 100, and the indicator 140 is used to signal that the housing assembly 18 is ready to receive the part 12 when the controller 100 determines that the frictional surface 26 is clean by following the process below. The indicator 140 may be any suitable configuration, and non-limiting examples of the indicator 140 may include a visual indicator, a sound indicator, a sensory indicator, etc. When the indicator 140 indicates that the housing assembly 18 is ready to receive the part 12, the part 12 engages the cap 96 of the shaft 74, which causes the shaft 74 to move in the first direction and causes the door apparatus 28 to move to the open position.

Particles 16 on a macroscopic level and a microscopic level may be captured via the cleaning system 98. For example, the image 130 may collect the data about the particles 16 on the macroscopic level. As another example, the sensor 128 of the vacuum 124 may collect the data about the particles 16 on the microscopic level. It is to be appreciated that in other configurations the image 130 may collect data about the particles 16 on the microscopic level, and the sensor 128 of the vacuum 124 may collect data about the particles 16 on the macroscopic level.

The image 130 of the frictional surface 26 of the pad 22 is collected while the door apparatus 28 is in the closed position. In certain configurations, collecting the image 130 may include collecting the image 130 via the camera 134. Therefore, the camera 134 may be configured to collect images 130 of sufficient quality to identify the particles 16 on the macroscopic level and/or the microscopic level. The controller 100 determines when to activate the camera 134 to take one or more of the images 130, and sends a signal to the camera 134 to take the images 130.

Furthermore, the light 136 may be activated inside the chamber 38 to illuminate the frictional surface 26 of the pad 22 to assist the camera 134 in collecting the image 130. As such, the light 136 may be activated before taking the image 130 of the frictional surface 26 of the pad 22. The controller 100 determines when to activate the light 136, and sends a signal to the light 136 to illuminate the chamber 38. Therefore, the light 136 assists in providing images 130 of sufficient quality to be used via the controller 100 to determine whether the frictional surface 26 of the pad 22 is clean.

The collected image 130 of the frictional surface 26 is compared with a reference image 142 of the frictional surface 26 to determine whether particles 16 have been detected on the frictional surface 26 to be removed. The reference image 142 of the frictional surface 26 may be stored in the memory 102 of the controller 100 and accessed when that workstation 14 is to perform the manufacturing process. The reference image 142 may be an image of a clean frictional surface of the pad 22.

The controller 100 may analyze and compare the collected image 130 with the reference image 142. The controller 100 may determine whether the amount of particles 16 on the frictional surface 26 of the pad 22 is at the predetermined clean threshold by comparing the collected image 130 and the reference image 142. Therefore, if the frictional surface 26 of the pad 22 meets the predetermined clean threshold, then the frictional surface 26 is clean, and the door apparatus 28 may move to the open position to receive the part 12. If the frictional surface 26 of the pad 22 does not meet the predetermined clean threshold, then the method proceeds to cleaning the frictional surface 26 of the pad 22.

To clean the frictional surface 26, it is desirable to suspend the particles 16 inside the chamber 38 away from the frictional surface 26. The fluid is directed at the frictional surface 26 of the pad 22 to move the particles 16 off of the frictional surface 26 and suspend the particles 16 inside of the chamber 38 when the particles 16 have been detected to be removed from the frictional surface 26. In certain configurations, directing the fluid may include directing the fluid via the fluid applicator 106. Therefore, the controller 100 activates the fluid applicator 106 to inject the fluid into the chamber 38. If using the valve 118, the controller 100 signals the valve 118 to open which allows the fluid to flow through the tube and out the outlets 122.

Next, the suspended particles 16 are vacuumed out of the chamber 38. In certain configurations, vacuuming the suspended particles 16 may include vacuuming the suspended particles 16 via the vacuum 124. The particles 16, with the fluid, are vacuumed out of the chamber 38 via the vacuum 124. Therefore, the controller 100 activates the vacuum 124 to remove the fluid and the particles 16 from the chamber 38.

The sensor 128 that is coupled to the vacuum 124 may detects the amount of the particles 16 being removed from the chamber 38. Therefore, the amount of the particles 16 being vacuumed out of the chamber 38 is sensed, via the sensor 128. The controller 100 collects the data from the sensor 128, and the controller 100 determines when the amount of particles 16 reach the predetermined range. Once the predetermined range of the particles 16 is met, the controller 100 may shut off the fluid applicator 106 and the vacuum 124.

Optionally, the optical assembly 132 may be reactivated after the fluid applicator 106 and the vacuum 124 is shut off. That is, the controller 100 may repeat the operation of taking one or more images 130 and comparing the images 130 to the reference image 142 to confirm that the frictional surface 26 of the pad 22 is clean. Once the controller 100 determines the frictional surface 26 is clean, the door apparatus 28 may be actuated to the open position.

If the controller 100 does not determine that the frictional surface 26 is clean, then the fluid applicator 106 may be reactivated to clean the frictional surface 26, and the optical assembly 132 may be reactivated to determine whether the frictional surface 26 is clean. If the controller 100 still does not identify that the frictional surface 26 is clean, then a manual process to clean the frictional surface 26 may be necessary.

It is to be appreciated that the order or sequence of performing the method as discussed above is for illustrative purposes and other orders or sequences are within the scope of the present teachings. It is to also be appreciated that the method may include other features not specifically identified in the method discussion above. Furthermore, it is to be appreciated that FIGS. 1, 2, 9, and 10 are general illustrations that may be suitable for any of the configurations discussed herein.

Aspects of the present disclosure have been described in detail with reference to the illustrated configurations. Those skilled in the art will recognize, however, that certain modifications may be made to the disclosed structure and/or methods without departing from the scope of the present disclosure. The disclosure is also not limited to the precise construction and compositions disclosed herein. Modifications apparent from the foregoing descriptions are within the scope of the disclosure as defined by the appended claims. Moreover, the present concepts expressly include combinations and sub-combinations of the preceding elements and features.

What is claimed is:

1. A housing assembly for selectively receiving a part; the housing assembly comprising:
   a platform;
   a pad fixed to the platform, and the pad has a frictional surface for maintaining a position of the part relative to the pad when the part is disposed on the frictional surface; and
   a door apparatus coupled to the platform and surrounding the pad, and wherein the door apparatus is movable to an open position in which the frictional surface of the pad is exposed outside of the door apparatus for receiving the part and a closed position in which the frictional surface of the pad is concealed inside of the door apparatus; and
   an actuator comprising an axially movable shaft mechanically coupled to the door apparatus and configured to move the door apparatus, the shaft being engaged by the part, wherein:
   a first axial displacement of the axially movable shaft by engagement with the part causes the door apparatus to move to the open position; and
   a second axial displacement of the axially movable shaft, in a direction opposite to the first axial displacement, occurs in response to a biasing member and causes the door apparatus to return to the closed position upon disengagement of the part.

2. The housing assembly as set forth in claim 1 wherein the door apparatus includes a first door segment and a second door segment movable relative to each other between the open position and the closed position.

3. The housing assembly as set forth in claim 2 wherein the door apparatus includes a first bellows attached to the first door segment and the platform, and a second bellows attached to the second door segment and the platform.

4. The housing assembly as set forth in claim 2 wherein the door apparatus includes a gear set coupled to the first door segment and the second door segment.

5. The housing assembly as set forth in claim 1 further including a cleaning system configured to remove particles from the frictional surface of the pad when the door apparatus is in the closed position.

6. A housing assembly for selectively receiving a part; the housing assembly comprising:
a platform;
a pad fixed to the platform, and the pad has a frictional surface for maintaining a position of the part relative to the pad when the part is disposed on the frictional surface;
a door apparatus coupled to the platform and surrounding the pad, and wherein the door apparatus is movable to an open position in which the frictional surface of the pad is exposed outside of the door apparatus for receiving the part and a closed position in which the frictional surface of the pad is concealed inside of the door apparatus;
a cleaning system configured to remove particles from the frictional surface of the pad when the door apparatus is in the closed position; and
wherein:
the door apparatus includes a first door segment and a second door segment movable relative to each other between the open position and the closed position;
the door apparatus includes a first bellows attached to the first door segment and the platform, and a second bellows attached to the second door segment and the platform; and
the first door segment, the first bellows, the second door segment, and the second bellows cooperate in the closed position to present a chamber that encloses the pad.

7. The housing assembly as set forth in claim 6 wherein the cleaning system includes a fluid applicator configured to direct a fluid at the frictional surface of the pad to move the particles off of the frictional surface and suspend the particles inside of the chamber.

8. The housing assembly as set forth in claim 7 wherein the fluid applicator includes a duct attached to the first door segment or the second door segment, and wherein the duct includes a plurality of outlets spaced from each other, and the fluid is directed out of the plurality of outlets.

9. The housing assembly as set forth in claim 7 wherein the cleaning system includes a vacuum coupled to the chamber, and configured to expel the particles that are suspended inside the chamber due to operation of the fluid applicator.

10. The housing assembly as set forth in claim 6 wherein the cleaning system includes an optical assembly configured to compile an image of the frictional surface of the pad when the first door segment and the second door segment are in the closed position.

11. The housing assembly as set forth in claim 10 wherein:
the optical assembly includes a camera attached to the first door segment or the second door segment, and the camera is configured to collect the image of the frictional surface of the pad; and
the optical assembly includes a light configured to illuminate the frictional surface of the pad when the first door segment and the second door segment are in the closed position during operation of the camera.

12. The housing assembly as set forth in claim 6 wherein:
the first door segment includes a first distal end and a second distal end spaced from each other along a first longitudinal axis;
the second door segment includes a first distal end and a second distal end spaced from each other along a second longitudinal axis;
the first door segment includes a first side edge having the first bellows fixed thereto;
the first door segment includes a second side edge spaced from the first side edge of the first door segment;
the second door segment includes a first side edge having the second bellows fixed thereto;
the second door segment includes a second side edge spaced from the first side edge of the second door segment;
the second side edge of the first door segment and the second side edge of the second door segment engage each other when the door apparatus is in the closed position;
the cleaning system includes a duct attached to the first door segment proximal to the second side edge of the first door segment;
the duct includes a plurality of outlets spaced from each other axially relative to the first longitudinal axis and the plurality of outlets face the frictional surface to direct a fluid at the frictional surface of the pad to move the particles off of the frictional surface and suspend the particles inside of the chamber; and
the cleaning system includes a camera attached to the second door segment proximal to the second side edge of the second door segment, and the camera is configured to collect an image of the frictional surface of the pad.

13. A housing assembly for selectively receiving a part, the housing assembly comprising:
a platform;
a pad fixed to the platform, the pad having a frictional surface for engaging the part;
a movable door apparatus surrounding the pad, the movable door apparatus being configured to move between an open position, where the frictional surface is exposed, and a closed position, where the frictional surface is concealed; and
an actuator comprising an axially movable shaft mechanically coupled to the moveable door apparatus and configured to move the moveable door apparatus, the shaft being engaged by the part, wherein:
a first axial displacement of the axially movable shaft by engagement with the part causes the door apparatus to move to the open position; and
a second axial displacement of the axially movable shaft, in a direction opposite to the first axial displacement, occurs in response to a biasing member and causes the moveable door apparatus to return to the closed position upon disengagement of the part.

14. The housing assembly of claim 13, further comprising a cleaning system configured to remove particles from the frictional surface of the pad when the movable door apparatus is in the closed position.

15. The housing assembly of claim 14, wherein the cleaning system includes a fluid applicator configured to direct a fluid at the frictional surface of the pad to dislodge particles.

16. The housing assembly of claim 15, wherein the fluid applicator includes a duct with a plurality of outlets positioned to direct fluid toward the frictional surface.

17. The housing assembly of claim 15, further comprising a vacuum configured to remove fluid and dislodged particles from a chamber when the movable door apparatus is in the closed position.

18. The housing assembly of claim 14, wherein the cleaning system includes an optical assembly configured to capture an image of the frictional surface and detect particles prior to cleaning.

19. The housing assembly of claim 18, wherein the optical assembly includes a light source configured to illuminate the frictional surface of the pad when the movable door apparatus is in the closed position.

20. The housing assembly of claim 18, further comprising a controller configured to analyze the image of the frictional surface and determine whether cleaning is required before opening the movable door apparatus.

* * * * *